US009963267B2

(12) United States Patent
Karas

(10) Patent No.: US 9,963,267 B2
(45) Date of Patent: May 8, 2018

(54) ELASTOMERIC BAND FOR REMOVABLY ATTACHING A BOTTLE TO A VERTICAL SURFACE

(71) Applicant: Steven L. Karas, Hopewell Junction, NY (US)

(72) Inventor: Steven L. Karas, Hopewell Junction, NY (US)

(*) Notice: Subject to any disclaimer, the term of this patent is extended or adjusted under 35 U.S.C. 154(b) by 188 days.

(21) Appl. No.: 14/937,952

(22) Filed: Nov. 11, 2015

(65) Prior Publication Data

US 2017/0129650 A1  May 11, 2017

(51) Int. Cl.
*A47G 23/02* (2006.01)
*B65D 23/00* (2006.01)
*F16B 2/22* (2006.01)
*F16B 1/00* (2006.01)

(52) U.S. Cl.
CPC ........... *B65D 23/003* (2013.01); *F16B 2/22* (2013.01); *A45F 2200/0583* (2013.01); *A47G 23/0241* (2013.01); *A47G 2200/106* (2013.01); *F16B 2001/0035* (2013.01)

(58) Field of Classification Search
CPC ......... B65D 23/003; B65D 23/00; F16B 2/22; F16B 2001/0035; A47G 2200/106; A47G 23/0241; A45F 2200/0583
USPC .................. 248/229.17, 228.8, 230.8, 74.3
See application file for complete search history.

(56) References Cited

U.S. PATENT DOCUMENTS

| 838,555 | A | * | 12/1906 | Levy | A45F 3/04 24/481 |
|---|---|---|---|---|---|
| 5,256,131 | A | * | 10/1993 | Owens | B65D 81/3886 220/903 |
| D349,864 | S | * | 8/1994 | Dunlap | D10/32 |
| 5,333,767 | A | | 8/1994 | Anderson | |
| 5,400,479 | A | * | 3/1995 | Medina | H01F 7/0263 24/303 |
| 5,682,653 | A | * | 11/1997 | Berglof | G09F 1/10 224/183 |
| D398,451 | S | * | 9/1998 | Sharpe | D6/323 |
| 5,833,188 | A | * | 11/1998 | Studdiford | B62J 11/00 248/229.17 |
| 6,012,993 | A | * | 1/2000 | Guerriero | A63B 21/4025 182/3 |
| 6,038,745 | A | * | 3/2000 | Rapp | A45F 3/14 24/165 |

(Continued)

FOREIGN PATENT DOCUMENTS

WO        03047819 A1    6/2003
WO   WO 2009025537 A1 *  2/2009  ............... A45F 5/00

OTHER PUBLICATIONS

Fancy.com, Magnetic Shampoo Wrapper, https://fancy.com/things/543958455455581778/Magnetic-Shampoo-Wrapper (retrieved Nov. 11, 2015).

*Primary Examiner* — Jonathan Liu

(57) ABSTRACT

An apparatus comprises an elongate band and a magnet assembly. The elongate band is formed of an elastomer and defines a back surface, a front surface, a loop at a first end, a hook at a second end, and an enclosure. The magnet assembly is at least partially enclosed within the enclosure. The apparatus provides a convenient means by which to removably attach a bottle to a vertical surface. The bottle may thereby be stored out-of-the-way while not in use, but easily accessed.

18 Claims, 5 Drawing Sheets

(56) References Cited

U.S. PATENT DOCUMENTS

| | | | | |
|---|---|---|---|---|
| 6,351,869 B1* | 3/2002 | Jones | A47L 13/16 | 15/209.1 |
| 6,467,132 B1* | 10/2002 | Robley | B65D 63/1018 | 24/16 PB |
| 6,913,176 B1* | 7/2005 | Buscemi | A45F 5/00 | 224/665 |
| D535,055 S * | 1/2007 | Been | D2/606 | |
| D606,300 S * | 12/2009 | Cameron | D3/215 | |
| 8,517,233 B2 | 8/2013 | Podda-Heubach | | |
| 8,590,823 B2* | 11/2013 | Rothbaum | F16G 11/00 | 24/115 R |
| 8,727,189 B2 | 5/2014 | Zieman et al. | | |
| 9,333,641 B2* | 5/2016 | Macias | B25H 3/00 | |
| 2002/0060275 A1* | 5/2002 | Polad | F16L 3/137 | 248/74.3 |
| 2002/0084393 A1* | 7/2002 | Torres | A63B 71/04 | 248/230.8 |
| 2004/0245415 A1* | 12/2004 | Sun | A47G 23/0225 | 248/206.5 |
| 2005/0082323 A1* | 4/2005 | O'Hair | A45C 1/04 | 224/219 |
| 2006/0261019 A1* | 11/2006 | Chao | A45F 3/18 | 211/74 |
| 2008/0235914 A1* | 10/2008 | Dolberg | B60N 3/026 | 16/430 |
| 2009/0283197 A1* | 11/2009 | Gorodisher | A41F 1/002 | 156/60 |
| 2010/0025442 A1* | 2/2010 | Shurm | A45F 5/00 | 224/183 |
| 2010/0233917 A1* | 9/2010 | Sorensen | H02G 3/26 | 439/874 |
| 2011/0290833 A1* | 12/2011 | Koerner | A45F 5/02 | 224/222 |
| 2012/0045597 A1* | 2/2012 | Ponce | A45F 3/00 | 428/34.1 |
| 2012/0125046 A1* | 5/2012 | Vander Wal | A44C 15/003 | 63/1.18 |
| 2013/0074545 A1* | 3/2013 | Moloney | A43B 23/24 | 63/3.1 |
| 2013/0323457 A1* | 12/2013 | Barringer | A47K 10/02 | 428/99 |
| 2014/0013544 A1* | 1/2014 | Moreau | A45F 5/00 | 24/3.12 |
| 2014/0033992 A1* | 2/2014 | Reed | A01K 27/001 | 119/792 |
| 2015/0150312 A1* | 6/2015 | LaHann | A41D 1/205 | 2/49.1 |
| 2015/0190689 A1* | 7/2015 | Dastrup | A63B 55/008 | 15/210.1 |
| 2015/0257468 A1* | 9/2015 | Sjoquist | A41F 1/002 | 24/303 |
| 2016/0259374 A1* | 9/2016 | Breiwa | H02J 50/10 | |
| 2017/0129650 A1* | 5/2017 | Karas | B65D 23/003 | |
| 2017/0219127 A1* | 8/2017 | Vermillion | F16L 3/13 | |

* cited by examiner

ELASTOMERIC BAND FOR REMOVABLY ATTACHING A BOTTLE TO A VERTICAL SURFACE

FIELD OF THE INVENTION

The present invention relates generally to apparatus for suspending, holding, or attaching one object to another, and, more particularly, to apparatus for removably attaching a bottle to a vertical surface.

BACKGROUND OF THE INVENTION

It is well recognized that an athlete feels stronger, and can exercise longer and more effectively, when well hydrated. Nevertheless, a person exercising in a gym will quickly realize that there are few convenient places to place a water bottle while working out. Most gym equipment, for example, is devoid of bottle holders. A gym goer will therefore soon resort to placing his or her water bottle on the only available horizontal surface, namely, the floor.

Storing one's water bottle on a dirty gym floor is not only unhygienic, but also creates a tripping hazard and may make the bottle prone to being knocked over. In addition, storing a bottle in this manner is inconvenient and breaks a workout "flow" by making a gym goer have to repeatedly bend over to pick up and put down his or her water bottle. Lastly, it is easy for one water bottle to get confused with another when they are placed on the floor, leading to uncertainty as to what bottle belongs to what owner.

For the foregoing reasons, there is a need for apparatus that allow a water bottle or other such bottle to be safely maintained out of the way, but easily accessed, while a person is exercising in a gym environment.

SUMMARY OF THE INVENTION

Embodiments of the present invention address the above-identified needs by providing apparatus capable of conveniently attaching a bottle to a vertical surface where the bottle may be easily accessed.

Aspects of the invention are directed to an apparatus comprising an elongate band and a magnet assembly. The elongate band is formed of an elastomer and defines a back surface, a front surface, a loop at a first end, a hook at a second end, and an enclosure. The magnet assembly is at least partially enclosed within the enclosure.

Additional aspects of the invention are directed to an apparatus comprising a bottle with a sidewall, an elongate band, and a magnet assembly. The elongate band is formed of an elastomer and defines a back surface, a front surface, a loop at a first end, a hook at a second end, and an enclosure. The magnet assembly is at least partially enclosed within the enclosure. The elongate band encircles the bottle with the back surface positioned against the sidewall. At the same time, the loop is captured by the hook, and the elongate band is stretched in length from a relaxed state.

Even additional aspects of the invention are directed to a method of removably mounting a bottle to a vertical surface. A bottle is received with a sidewall. In addition, an apparatus is received comprising an elongate band. The elongate band is formed of an elastomer and defines a back surface, a front surface, a loop at a first end, a hook at a second end, and an enclosure. The magnet assembly is at least partially enclosed within the enclosure. The elongate band is caused to encircle the bottle with the back surface positioned against the sidewall such that the loop is captured by the hook and the elongate band is stretched in length from a relaxed state. The magnet assembly is magnetically coupled to the vertical surface to cause the bottle to be solely supported by the elongate band.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

The adverb "manually," as used in this description and the appended claims, is intended to mean capable of being performed by an adult human being of average strength with only his hands and without resort to tools. The term "bottle" is intended to encompass any container capable of holding a liquid and from which a person may drink. A "bottle" is not limited to a container with a particular form and may include, for example, various forms of bottles, cups, cans, jugs, canteens, flasks, and the like.

Embodiments of the invention provide an apparatus for removably fixating a bottle to a vertical ferromagnetic surface (e.g., a surface comprising iron, nickel, and/or cobalt). The apparatus thereby allows the bottle to be conveniently maintained out of the way and off the floor until an owner wishes to take a drink. The apparatus may be of particular value in a gym environment, but its use is in no way limited thereto.

Figure 1:
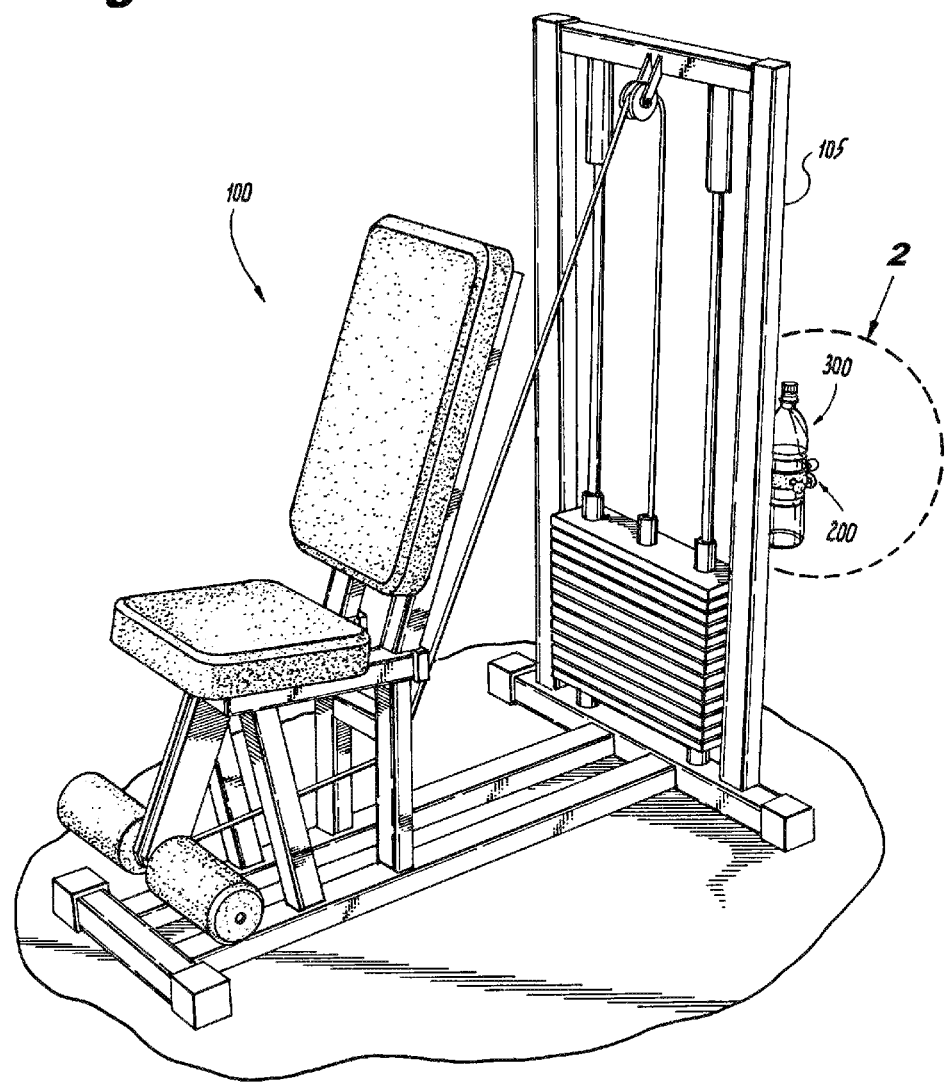
FIG. 1 shows a perspective view of a piece of gym equipment with an illustrative apparatus and bottle fixated thereto.

FIG. 1 shows a perspective view of a piece of gym equipment 100, in this particular case, a leg extension machine, with an apparatus 200 in accordance with an illustrative embodiment of the invention. The apparatus 200 is removably attached to a vertical surface 105 of the piece of gym equipment 100. The apparatus 200 encircles a bottle 300. The apparatus 200 is magnetically coupled to the vertical surface 105 such that the bottle 300 is solely supported by the apparatus 200.

Figures 2, 3:
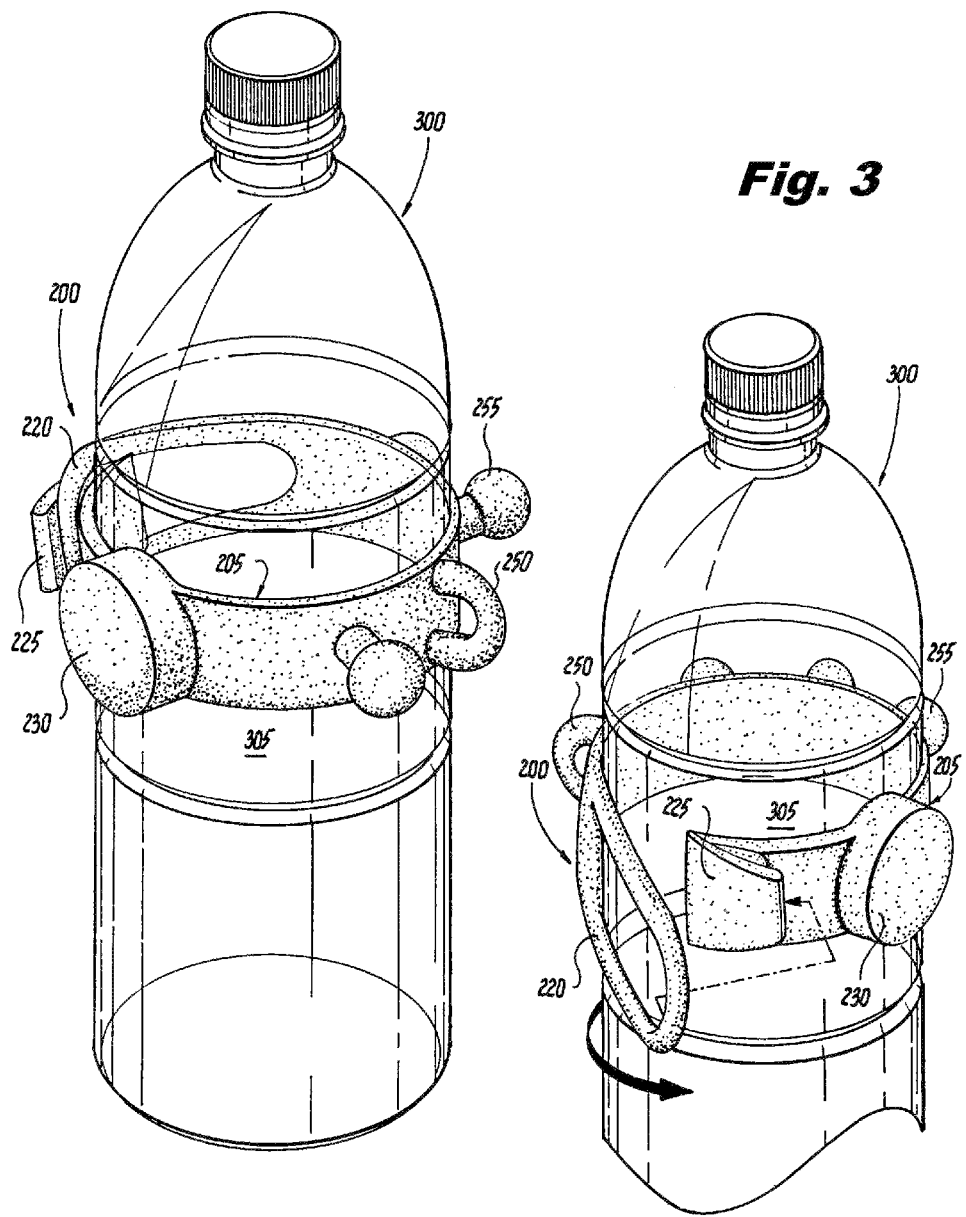
FIG. 2 shows a perspective view of the FIG. 1 apparatus encircling the bottle with the elongate band hooked.
FIG. 3 shows another perspective view of the FIG. 1 apparatus and bottle with the elongate band unhooked.
Figure 4:
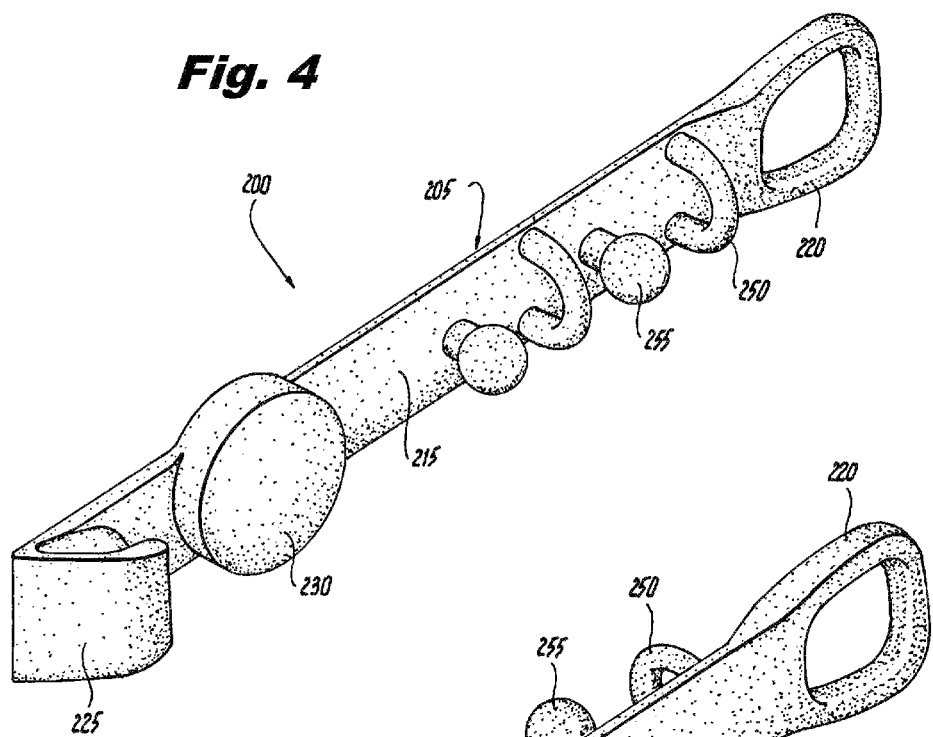
FIG. 4 shows a front perspective view of the FIG. 1 apparatus laid flat.
Figure 5:
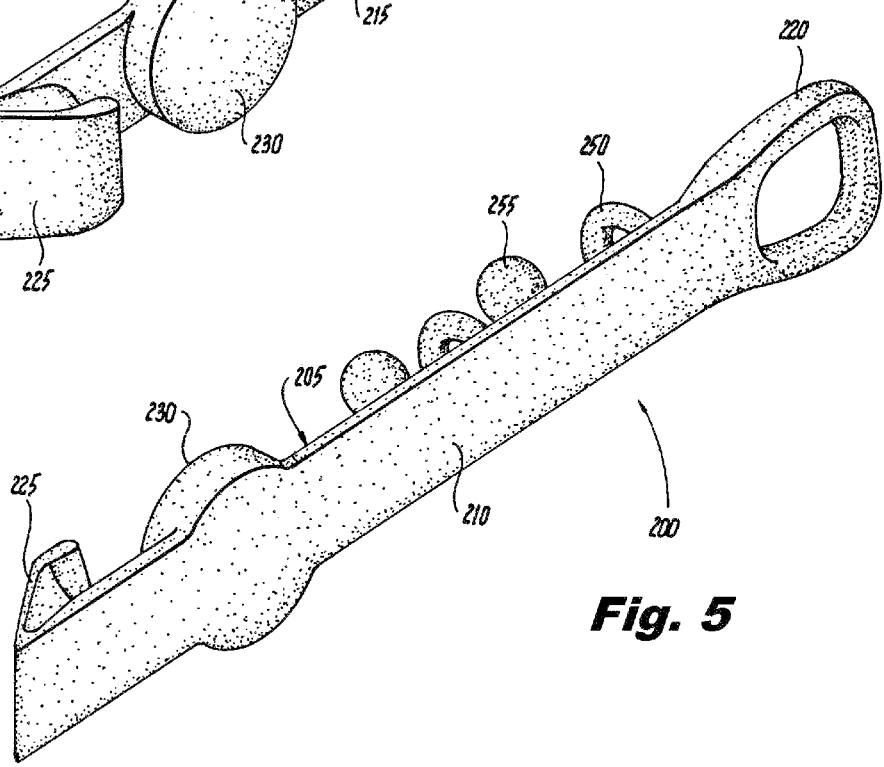
FIG. 5 shows a rear perspective view of the FIG. 1 apparatus laid flat.
Figure 6:
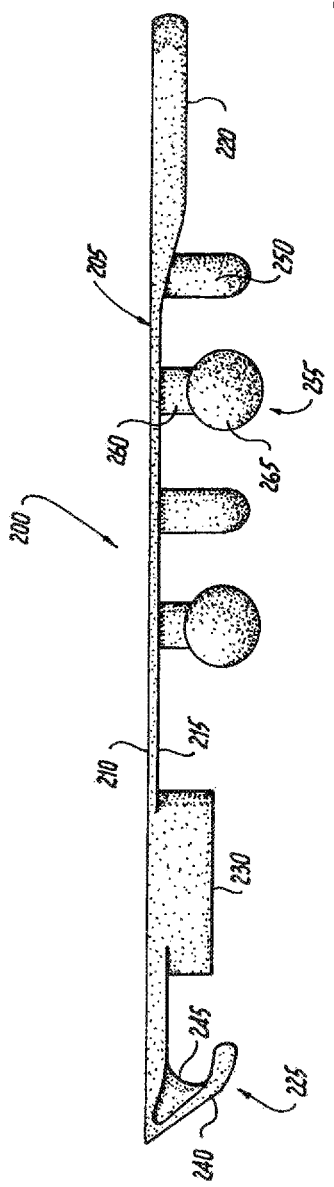
FIG. 6 shows a side elevational view of the FIG. 1 apparatus laid flat.

FIGS. 2-6 show additional aspects of the apparatus 200. More particularly, FIGS. 2 and 3 show perspective views of the apparatus 200 encircling the bottle 300 while hooked and unhooked, respectively; and FIGS. 4-6 show a front perspective view, a rear perspective view, and a side elevational view, respectively, of the apparatus 200 while laid flat in a relaxed (i.e., un-stretched) state. The apparatus 200 can be conceptually broken down into several constituent elements: an elongate band 205 with a back surface 210, a front surface 215, a loop 220 at a first end, a hook 225 at a second end (opposite the first end), and an enclosure 230. A magnet assembly 235 is encapsulated within the enclosure 230, and is detailed below.

In accordance with aspects of the invention, the elongate band 205 is formed of a unitary elastomeric element. In one or more embodiments, for example, the elongate band 205 may be formed of a single, continuous piece of rubber. This composition allows the elongate band 205 to be manually stretchable in length. The loop 220 at one end of the apparatus 200 is parallel with the back surface 210 with the elongate band 205 laid flat as shown in FIGS. 4-6. The hook 225 on the other end of the apparatus defines an angled projection 240 that forms an oblique angle with the back surface 210, again, with the elongate band 205 laid flat (see FIG. 6). A rounded filler 245 fills a portion of the region between the front surface 215 and the angled projection 240. Notably, the regions of the elongate band 205 defining the loop 220 and the hook 225 are somewhat thicker than the remainder of the elongate band 205 (again, see FIG. 6). The thickened material forming the loop 220 makes the loop 220 less likely to break when being stretched. The thickened material forming the hook 225 causes the hook 225 to distort less when the elongate band 205 is stretched. The hook 225 thereby retains its shape to a large degree, and is better able to capture the loop 220.

The apparatus 200 further defines two accessory rings 250 and two ball connectors 255 attached to the front surface 215. The accessory rings 250 are c-shaped. Each ball connector 255 defines a respective pedestal 260 topped by a respective spherical member 265 (see FIG. 6). In the present illustrative embodiment, the pedestal 260 is cylindrical and has a diameter smaller than that of the spherical member 265. However, in other embodiments, the pedestal 260 may be square or rectangular in cross-section rather than round.

Figure 7:
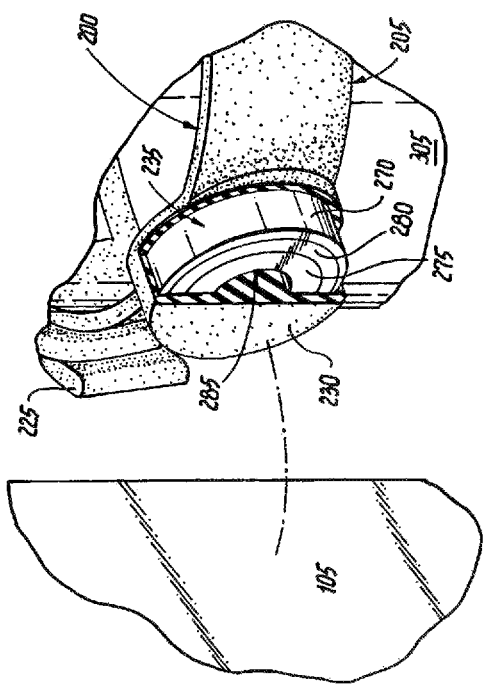
FIG. 7 shows a partially broken perspective view of the magnet portion of the FIG. 1 apparatus and a ferromagnetic vertical surface.

FIG. 7 goes on to show a partially broken perspective view of the magnet portion of the apparatus 200, which helps to elucidate details of the magnet assembly 235 enclosed within the enclosure 230. The magnet assembly 235 consists of a pot-type magnet comprising a round metallic cup 270 with a hole in its bottom and a ring-shaped magnet 275 disposed in the metallic cup 270. A spacer 280 fills the region between the ring-shaped magnet 275 and the sidewall of the round metallic cup 270. The ring-shaped magnet 275 and the hole in the bottom of the round metallic cup 270 combine to form a channel 285 that passes axially through the magnet assembly 235. In accordance with aspects of the invention, this channel 285 is filled by a portion of the elastomer of the elongate band 205, substantially helping to secure the magnet assembly 235 in the enclosure 230.

Pot magnets like the magnet assembly 235 have the unique characteristic of having the majority of their magnetic fields directed away from the bottom of the round metallic cup 270. That is, in pot magnets, a majority of the south pole is redirected to face north. Pot magnets therefore tend to have a strong magnetic attraction in one direction, and a much weaker attraction in the opposite direction. As oriented in the apparatus 200 with the apparatus 200 laid flat, a majority of the magnetic field of the magnet assembly 235 is oriented away from the front surface 215.

Now referring back to FIGS. 2 and 3, the apparatus 200 may be secured about the bottle 300 simply by stretching the elongate band 205 around the bottle 300 such that the back surface 210 of the elongate band 205 is positioned against a sidewall 305 of the bottle 300, and then causing the hook 225 to capture the loop 220. After such securement, the magnet assembly 235 in the enclosure 230 will be oriented such that the majority of its magnetic field is directed away from the bottle 300. The magnet assembly 235 thereby becomes a means by which the apparatus 200 and the bottle 300 may be removably fixated to a ferromagnetic surface.

With the apparatus 200 encircling and latched about the bottle 300, the back surface 210 forms a high friction interface with the bottle 300, inhibiting the bottle 300 from sliding downward in the elongate band 205. If the elongate band 205 is formed of silicone rubber, for example, the back surface 210 may be somewhat tacky to the touch and have a very high coefficient of friction.

Figure 8:
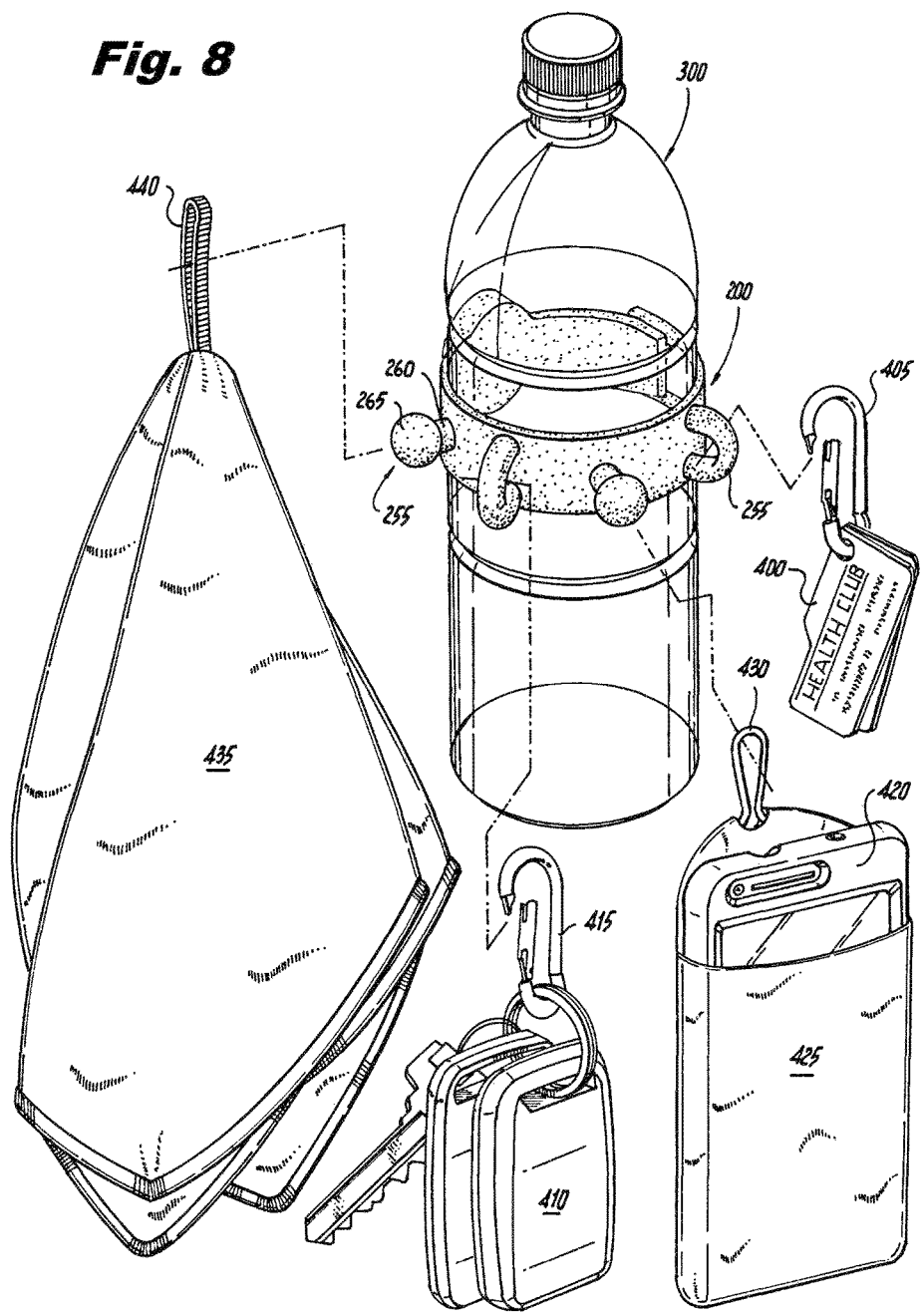
FIG. 8 shows an exploded perspective view of the FIG. 1 apparatus and bottle with the inclusion of various exemplary accessories that may be supported by the apparatus.

At the same time, with the apparatus 200 secured about the bottle 300, the accessory rings 250 and the ball connectors 255 project outward away from the bottle 300. The attachment points may be utilized to secure many different accessories to the apparatus 200. FIG. 8 shows an exploded perspective view of several such accessories in association with the apparatus 200 and the bottle 300. In the figure, identification cards 400 (e.g., gym membership cards) are attached to one accessory ring 250 via a first karabiner 405, and keys 410 are attached to the other accessory ring 250 via a second karabiner 415. In both cases, any metallic elements are far enough away from the magnet assembly 235 so as to not significantly interact therewith. At the same time, a cellular telephone 420 in a pouch 425 is attached to one of the ball connectors 255 via a loop 430 built into the pouch 425, and a towel 435 is attached to the other ball connector 255 via a loop 440 built into the towel 435. In all cases, the various accessories remain out of the way, yet easily accessible.

The towel 435 with its built-in loop 440 in combination with the apparatus 200 and its ball connector 255 are of particular advantage because it may be desirable for the user of the apparatus 200 to repeatedly remove the towel 435 from the apparatus 200 and then reattach it after the towel 435 is utilized. Both motions are made easy. Attachment is as straightforward as passing the loop 440 over the spherical member 265 of the ball connector 255 such that the loop 440 rests on that ball connector's pedestal 260. The towel 435 may then be left to hang from the apparatus 200 out of the way. Removal simply requires a swift tug of the towel 435 away from the apparatus 200.

Once understood from the teachings herein, the apparatus 200 may be formed by conventional manufacturing techniques using off-the-shelf components and materials. In one or more embodiments, for example, the elongate band 205 may be formed of molded silicone.

A prototype of an apparatus similar to the apparatus 200 was formed by making a mold and then filling the mold with a platinum cure liquid silicone compound called DRAGON SKIN® 20 obtained from Smooth On, Inc. (Macungie, Pa., USA) (with DRAGON SKIN being a registered trademark of Smooth-On, Inc.). The silicone was then cured. This particular silicone material is characterized by a Shore A Hardness of 20 A, a tensile strength of 550 pounds-per-square-inch (psi), a 100% modulus of 49 psi, an elongation at break of 620%, a die B tear strength of 120 pounds-per-linear-inch, and a shrinkage of less than 0.001 inches-per-inch.

A pot magnet was obtained for the prototype from Amazing Magnets LLC (Anaheim, Calif., USA) with part number CUPH1000. The ring-shaped magnet was a rare earth magnet formed of neodymium, iron, and boron (NdFeB). The diameter of the magnet assembly was 1 inch; the height was 0.315 inches. Surface field was 4,510 Gauss. Max pull strength was 53 pounds. The magnet assembly was easily incorporated into the prototype by simply placing the magnet assembly in the mold before pouring the liquid silicone.

In a relaxed, un-stretched state, the prototype was about 200 mm long while laid flat. At the same time, due to its elasticity, the prototype was able to encircle and thereby secure bottles of many different dimensions. The prototype, for example, was able to encircle water bottles with diameters from about 68 mm to about 93 mm without issue. The prototype was therefore able to stretch to some 150% of its relaxed length. At the same time, the prototype exhibited a high coefficient of friction with the bottles. As a result, even full water bottles were magnetically secured to ferromagnetic vertical surfaces without the bottle slipping in the prototype, and without the prototype and bottle sliding downward on the vertical surface. Removing the prototype and bottle from the vertical surface could be accomplished relatively easily by a swift pulling motion. Once removed from a bottle, the prototype returned to its original state without seemingly retaining any memory of being stretched. The rubber coating on the face of the magnet assembly where it contacted the vertical surface caused the prototype and bottle to not leave any scratches or permanent marks on the vertical surface.

For large scale manufacturing, injection molding may be utilized to form apparatus falling within the scope of the invention. Injection molding will already be familiar to one having ordinary skill in the relevant manufacturing arts. It is also described in many readily available publications including, as just one example, D. V. Rosato et al, *Injection Molding Handbook*, Springer Science & Business Media, 2012, which is hereby incorporated by reference herein.

As indicated above, the apparatus 200, and, more generally, apparatus falling within the scope of the invention, provide a convenient means for removably attaching bottles to vertical surfaces. While not limited to use in a gym, such use may be of particular advantage. While using an apparatus like the apparatus 200, a gym-goer may place his or her bottle on a piece of exercise equipment where a bottle holder is not provided. This keeps the bottle off the dirty gym floor, and prevents the user from having to repeatedly bend over to pick up and put down the bottle. It also reduces the chances of the bottle being tipped over or tripped over, and the chances that there will be confusion as to which bottle belongs to which user. At the same time, due to its elasticity, one size of apparatus is able to accommodate bottles of many different shapes and sizes, making the apparatus "universal."

In addition, the several accessory rings and ball connectors also provide the gym goer with the ability to conveniently attach one more accessories to the apparatus, like, for example, gym membership cards, keys, cellular telephones, and towels. In each case, these accessories may be easily accessed. A towel with a loop, for example, may be removed from, and reattached to, one of the ball connectors of the apparatus in a quick and efficient manner.

It should again be emphasized that the above-described embodiments of the invention are intended to be illustrative only. Other embodiments can use different types and arrangements of elements for implementing the described functionality. For example, while a particular arrangement of accessory rings and ball connectors is shown above, an alternative apparatus falling within the scope of the invention may utilize a very different arrangement (e.g., different numbers of attachment points and/or different types of attachment points). Moreover, while the apparatus above utilized a single type of elastomer, one or more alternative embodiments may utilize more than one type. For example, it may be advantageous to make that portion of the apparatus incorporating the enclosure for the magnet assembly and the hook out of an elastomeric material harder than the remainder of the apparatus (e.g., a Shore A Hardness of 50 A instead of 20 A). Such a configuration may cause the hook and enclosure to distort less when the elongate band is stretched. These numerous alternative embodiments within the scope of the appended claims will be apparent to one skilled in the art.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "step of" in the claims herein is not intended to invoke the provisions of AIA 35 U.S.C. § 112(f).

What is claimed is:

1. An apparatus comprising:
    an elongate band formed of a single, continuous elastomeric element, and defining:
        a back surface;
        a front surface;
        a loop at a first end;
        a hook at a second end defining an angled projection forming an oblique angle with respect to the back surface and an at least partially rounded filler portion filling a portion of a region between the front surface and the angled projection;
        an enclosure protruding from the front surface; and
        an accessory ring spanning between two separated locations on the front surface; and
    a magnet assembly at least partially enclosed within the enclosure;
    wherein the apparatus is manually positionable such that the loop is captured by the hook with a section of the loop abutting the at least partially rounded filler portion.

2. The apparatus of claim 1, wherein the elongate band is manually stretchable to at least 150 percent of its relaxed length.

3. The apparatus of claim 1, wherein the elongate band comprises silicone.

4. The apparatus of claim 1, wherein the loop is parallel to the back surface with the apparatus laid flat.

5. The apparatus of claim 1, wherein the magnet assembly comprises:
    a metallic cup; and
    a magnet positioned in the metallic cup.

6. The apparatus of claim 1, wherein the magnet assembly defines a channel passing therethrough.

7. The apparatus of claim 6, wherein the channel is filled by a portion of the elongate band.

8. The apparatus of claim 1, wherein the magnet assembly is entirely encapsulated within the enclosure.

9. The apparatus of claim 1, wherein:
the magnet assembly emits a magnetic field; and
at least a portion of the magnetic field is oriented away from the front surface with the apparatus laid flat.

10. The apparatus of claim 1, wherein the elongate band further defines a second accessory ring.

11. The apparatus of claim 10, further comprising a karabiner attached to the accessory ring.

12. The apparatus of claim 1, wherein the elongate band further defines a ball connector, the ball connector defining:
a pedestal; and
a spherical member disposed on the pedestal.

13. The apparatus of claim 12, wherein the pedestal is cylindrical with a diameter smaller than a diameter of the spherical member.

14. The apparatus of claim 12, further comprising a towel with a loop encircling the pedestal.

15. The apparatus of claim 1, wherein the elongate band is formed of two elastomeric portions characterized by different hardnesses.

16. An apparatus comprising:
a bottle with a sidewall;
an elongate band formed of an elastomer and defining:
a back surface;
a front surface;
a loop at a first end;
a hook at a second end defining an angled projection forming an oblique angle with respect to the back surface and an at least partially rounded filler portion filling a portion of a region between the front surface and the angled projection;
an enclosure protruding from the front surface; and
an accessory ring spanning between two separated locations on the front surface; and
a magnet assembly at least partially enclosed within the enclosure;
wherein:
the elongate band encircles the bottle with the back surface positioned against the sidewall;
the loop is captured by the hook with a section of the loop abutting the at least partially rounded filler portion; and
the elongate band is stretched in length from a relaxed state.

17. The apparatus of claim 16, wherein the elongate band is operative to solely support the bottle with the magnet assembly magnetically fixated to a vertical surface.

18. A method comprising the steps of:
receiving a bottle with a sidewall;
receiving an apparatus comprising:
an elongate band formed from an elastomer and defining:
a back surface;
a front surface;
a loop at a first end;
a hook at a second end defining an angled projection forming an oblique angle the respect to the back surface and an at least partially rounded filler portion filling a portion of a region between the front surface and the angled projection;
an enclosure protruding from the front surface; and
an accessory ring spanning between two separated locations on the front surface; and
a magnet assembly at least partially enclosed within the enclosure;
causing the elongate band to encircle the bottle with the back surface positioned against the sidewall such that the loop is captured by the hook with a section of the loop abutting the at least partially rounded filler portion and the elongate band is stretched in length from a relaxed state; and
magnetically coupling the magnet assembly to a vertical surface to cause the bottle to be solely supported by the elongate band.

* * * * *